United States Patent [19]
Davis et al.

[11] Patent Number: 5,937,992
[45] Date of Patent: Aug. 17, 1999

[54] ASSEMBLING APPARATUS AND PROCESS

[75] Inventors: John R. Davis, Deerwood; Larry A. Rasmussen, Crosslake, both of Minn.

[73] Assignee: Riverwood International Corporation, Atlanta, Ga.

[21] Appl. No.: 08/686,811

[22] Filed: Jul. 26, 1996

[51] Int. Cl.$^6$ .................................................. B65G 43/00
[52] U.S. Cl. .......................... 198/341.01; 198/341.04; 198/345.1; 198/836.3
[58] Field of Search ........................... 198/345.1, 345.3, 198/836.3, 341.04, 341.01

[56] References Cited

U.S. PATENT DOCUMENTS

| | | | |
|---|---|---|---|
| 3,259,384 | 7/1966 | Hittenberger | 271/62 |
| 3,876,489 | 4/1975 | Chenel | 156/566 |
| 4,202,092 | 5/1980 | Shibasaki et al. | 198/345.1 |
| 4,516,318 | 5/1985 | Kirschenman | 198/345.3 |
| 4,881,934 | 11/1989 | Harston et al. | 493/315 |
| 4,917,226 | 4/1990 | Blocker | 198/345.1 |
| 4,928,806 | 5/1990 | Anderson et al. | 198/345.1 |
| 5,161,791 | 11/1992 | Akiyama et al. | 271/12 |
| 5,282,524 | 2/1994 | Kakida et al. | 198/345.3 |
| 5,579,885 | 12/1996 | Hollis et al. | 198/345.1 |

*Primary Examiner*—Joseph E. Valenza
*Attorney, Agent, or Firm*—Anthony G. Eggink; Jeffery L. Cameron

[57] ABSTRACT

An assembling apparatus and process. The apparatus has a conveyor with a pair of parallel and elongated line guides fixed thereabove. Articles are placed onto the conveyor between the parallel line guides and a plurality of line stop mechanisms are provided to momentarily stop articles on the conveyor with respect to the parallel line guides. A plurality of supply magazines are provided for releasably storing elements to stack and assemble the articles. A stream of first articles is provided on the conveyor. The process further includes the steps of stopping the first articles on the horizontal work surface in alignment with each supply magazine and between the elongated line guides, transferring an element from each supply magazine onto the first articles and releasing the first articles for successive movement on the conveyor to each supply magazine.

20 Claims, 10 Drawing Sheets

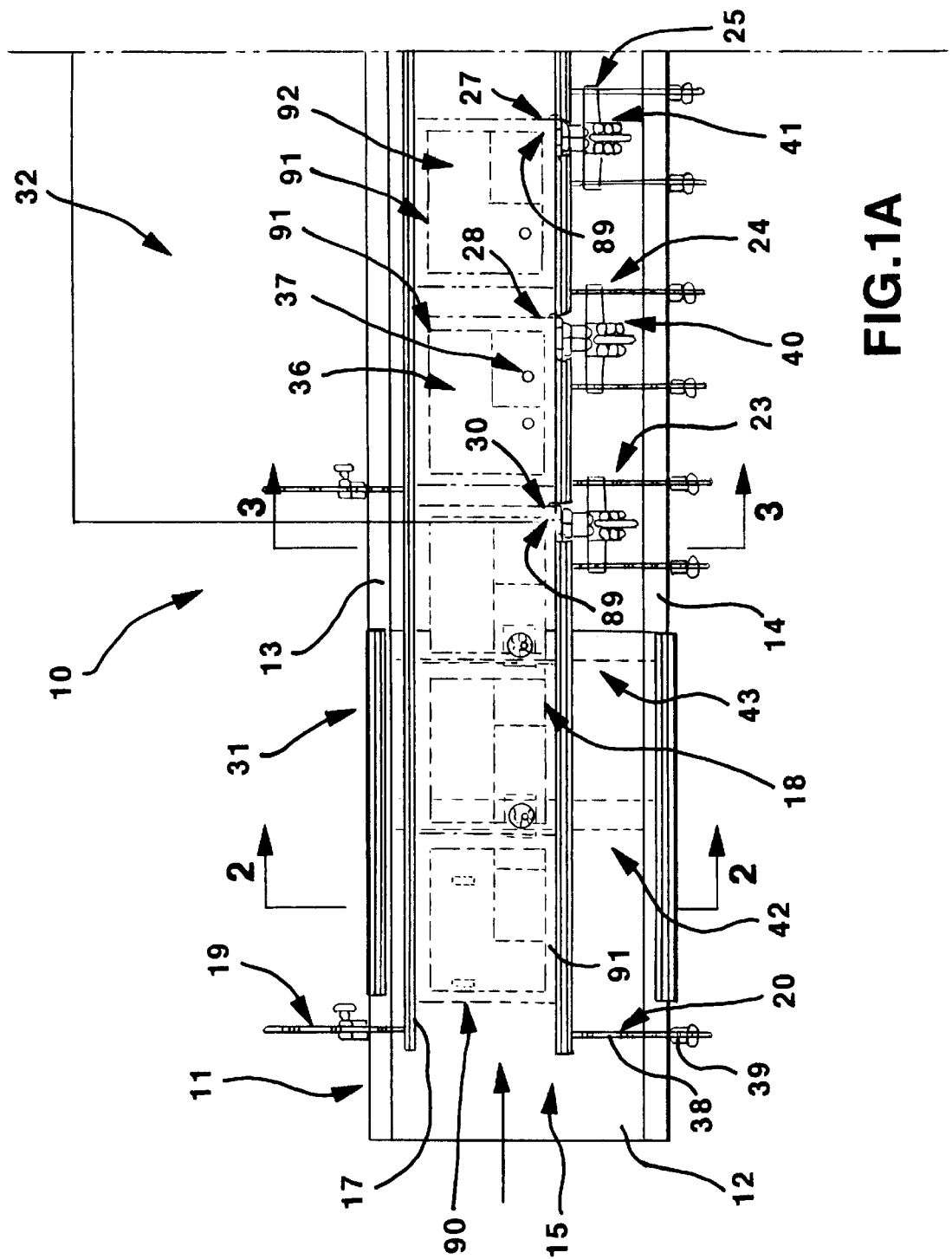

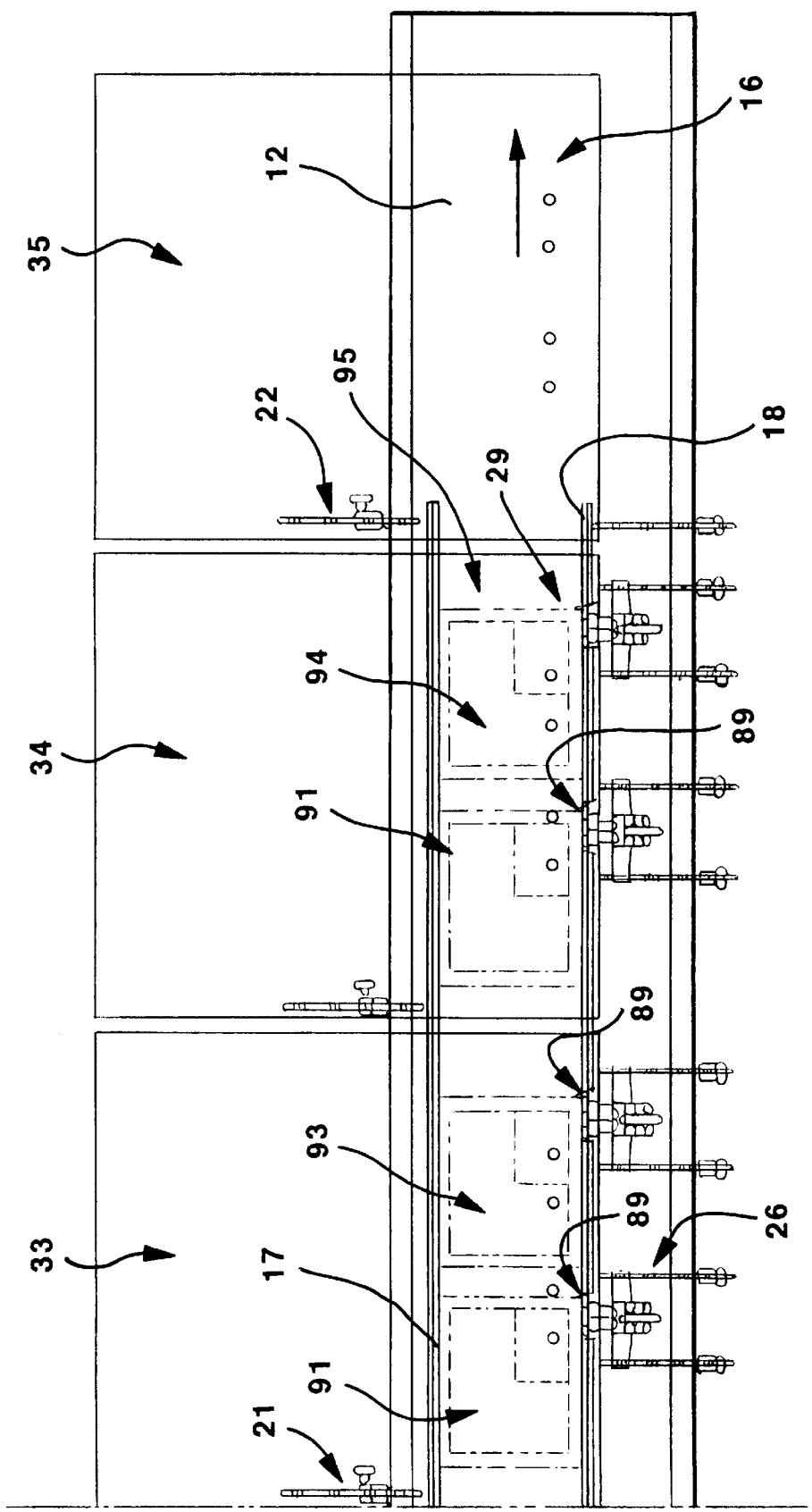

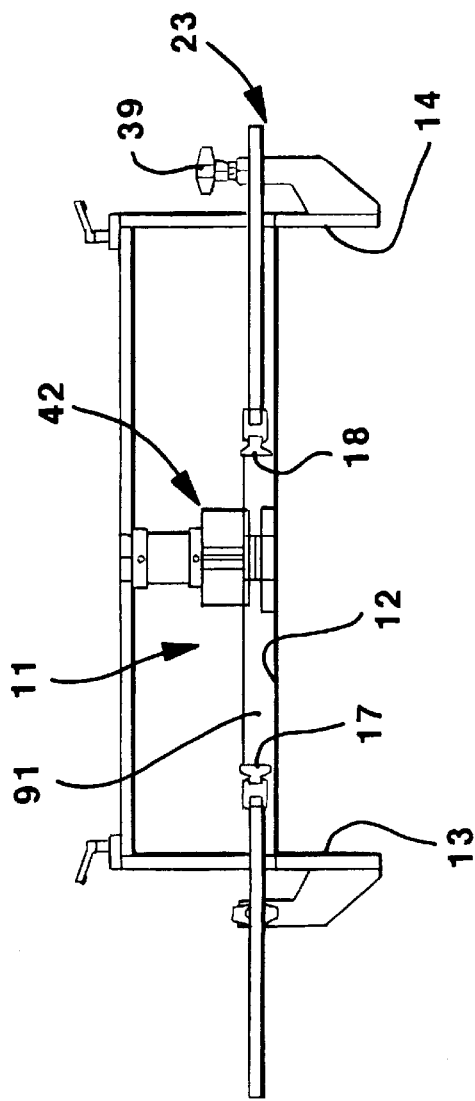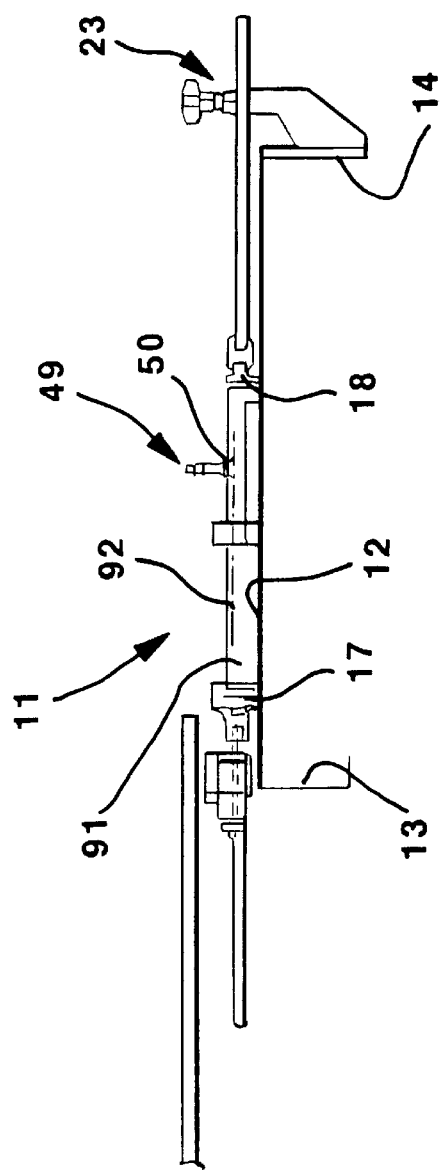
FIG.2
FIG.3

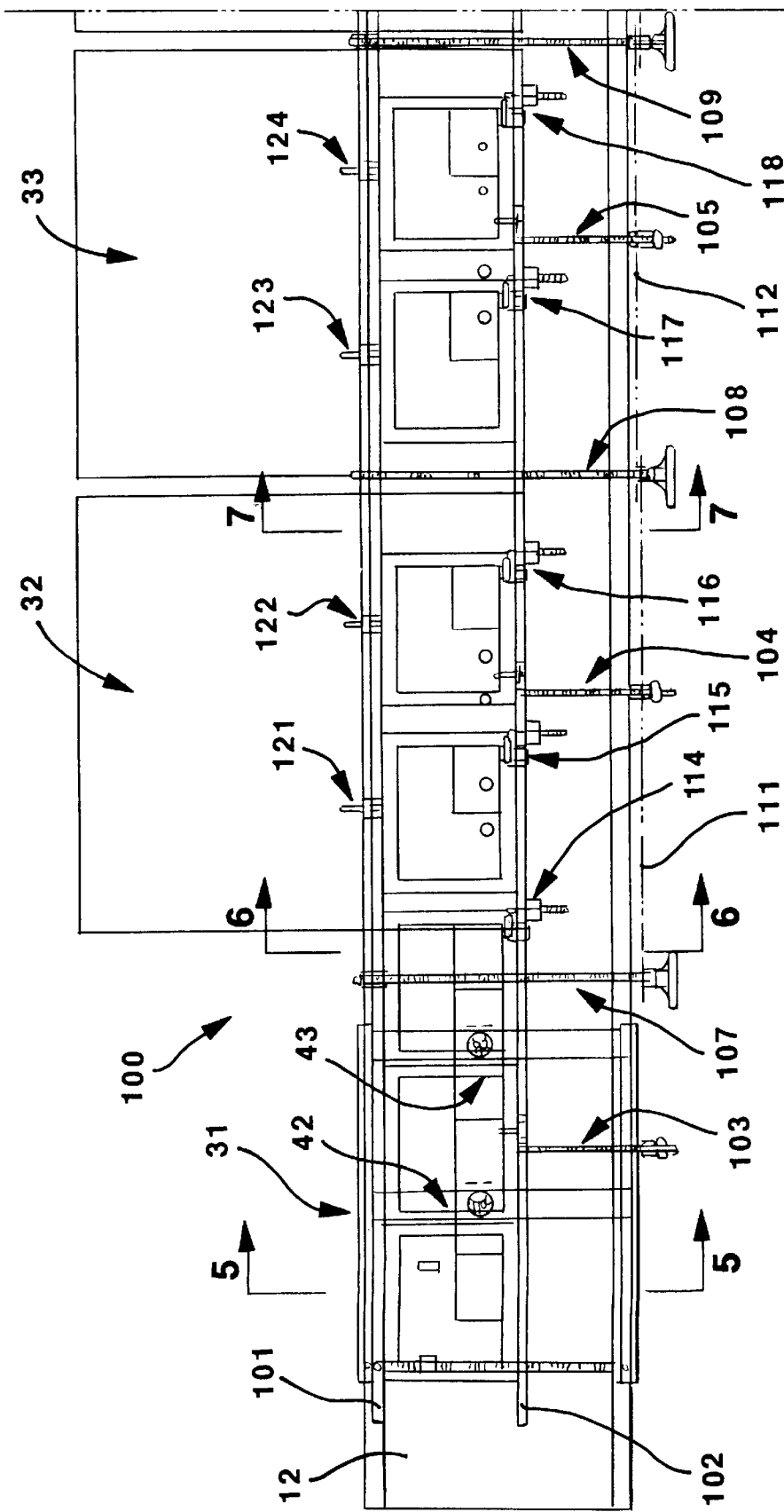

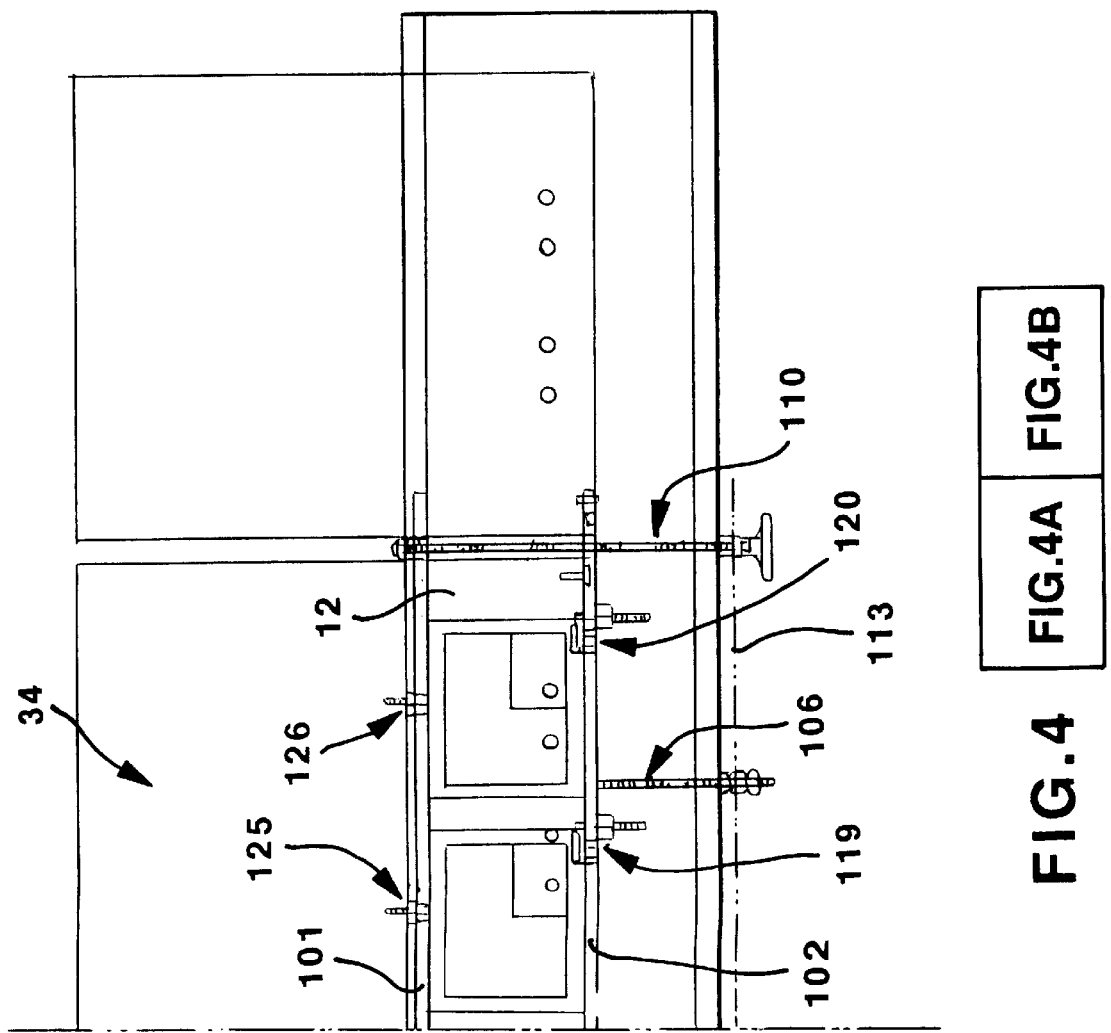

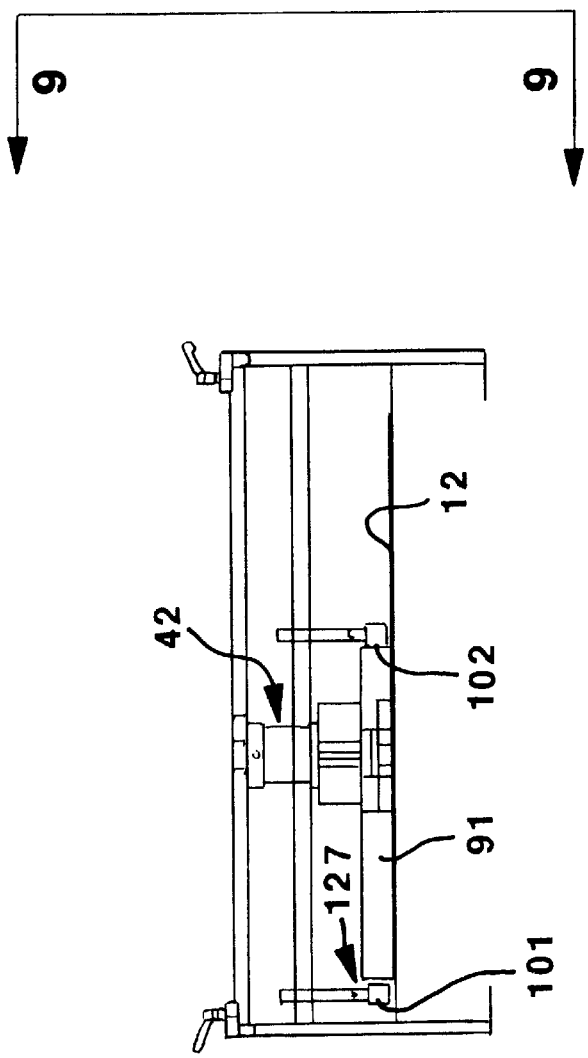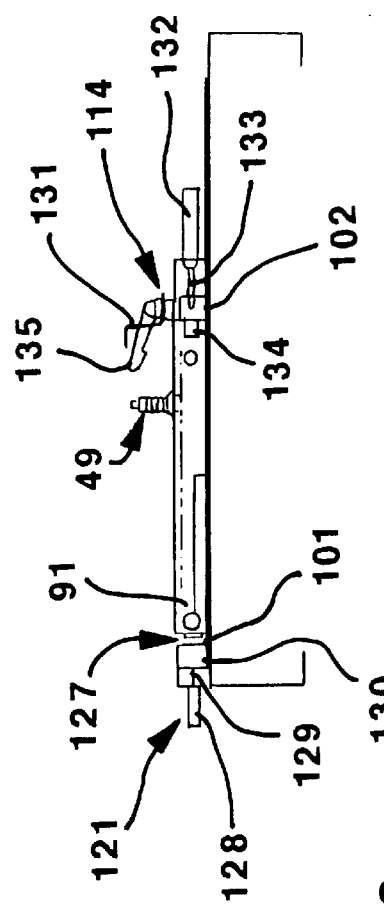

5,937,992

ASSEMBLING APPARATUS AND PROCESS

BACKGROUND OF THE INVENTION

This invention relates generally to an apparatus and process for assembling articles. Particularly, this invention relates to an assembly and process for stacking articles on a conveying surface. The apparatus and process of the invention relate particularly to the assembly of picture frames wherein the individual elements or parts of the frames are quickly and accurately transferred from respective supply magazines and stacked onto inverted frames on a conveyor.

The manufacture of picture frames has heretofore involved the manual placement of the picture frame parts within the frame periphery. For example, the manual assembly of picture frames has generally involved the manipulation of glass pieces into an inverted frame and the subsequent placement of sales sheets and backing boards into the frame confines and on top of the glass previously placed therein. These manual assembly steps have been found cumbersome and relatively slow. The assembly and process of the present invention provides an automated and continuous means of assembling picture frames which results in an efficient and accurate placement process of assembling picture frames.

Although prior art devices and processes have been utilized to transfer articles from storage magazines onto objects being conveyed on a conveying surface, none insofar as is known, has been utilized or proposed in the art to assembly picture frames in a continuous manner as provided by the apparatus and process of the present invention.

Accordingly, it is an object of the present invention to provide an assembling apparatus and a process for the continuous and automated assembly of picture frames. It is a further object of the invention to provide a conveyor having a horizontal work surface and a pair of parallel and elongated line guides fixed above the conveyor for the movement of picture frame parts. It is still a further object to provide a plurality of work stations having a plurality of supply magazines positioned adjacent and within reach of the conveyor for the releasable storage of picture frame parts or elements to transfer the parts therefrom and onto the partially assembly frames.

Finally, it is an object of this invention to provide a plurality of line stops in alignment with and as part of a plurality of work stations to thereby momentarily stop the partially assembled frames to receive additional elements from the respective supply magazines.

SUMMARY OF THE INVENTION

The present invention provides apparatus and processes for stacking articles on a conveyor to form a stream of stacked or assembled products. The assembling apparatus comprises a conveyor having a pair of parallel and elongated line guides fixed thereabove. The apparatus includes a plurality of work stations and means to place articles onto the conveyor between the parallel line guides. A plurality of line stop mechanisms are provided and which are constructed and arranged to momentarily stop articles on the conveyor and with respect to the parallel line guides.

The present invention further provides a process for assembling picture frames wherein a conveyor having a moving horizontal work surface is provided. A pair of parallel and elongated line guides fixed above the moving work surface and a plurality of supply magazines are provided for releasably storing elements to assemble the picture frames.

A stream of inverted frames is moved on the conveyor. The blank frames are stopped on the moving horizontal work surface of the conveyor in alignment with each supply magazine and between the elongated line guides. An article from each supply magazine is transferred into the confines of the inverted frames and the frames are then released for successive movement on the conveyor to each successive supply magazine.

These and other benefits of this invention will become clear from the following description by reference to the drawings.

BRIEF DESCRIPTION OF THE DRAWINGS

FIG. 1, comprising FIG. 1A and FIG. 1B, is a top plan view showing an article assembling apparatus of the present invention and wherein FIG. 1A shows the left side of the apparatus and FIG. 1B shows the right side of the apparatus;

FIG. 2 is a view taken along line 2—2 of FIG. 1;

FIG. 3 is a view taken along line 3—3 of FIG. 1;

FIG. 4, comprising FIG. 4A and FIG. 4B, is a top plan view showing another embodiment of the article assembling apparatus and wherein FIG. 4A shows the left side of the apparatus and FIG. 4B shows the right side of the apparatus;

FIG. 5 is a view taken along line 5—5 of FIG. 4;

FIG. 6 is a view taken along line 6—6 of FIG. 4;

DESCRIPTION OF THE PREFERRED EMBODIMENTS

Figure 7:
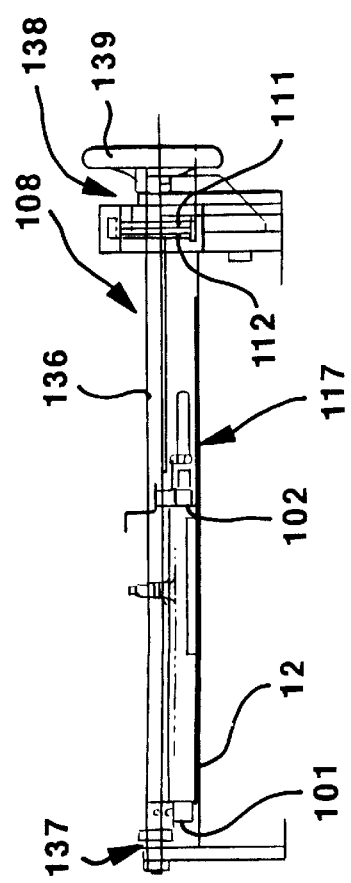
FIG. 7 is a view taken along line 7—7 of FIG. 4.
Figure 9:
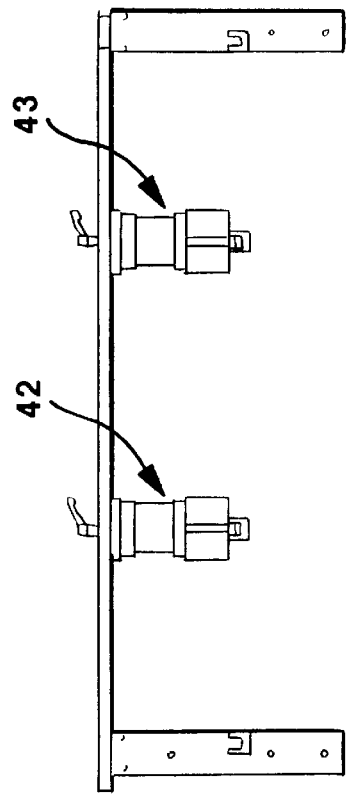
FIG. 9 is a view taken along line 9—9 of FIG. 5.

The apparatus and processes of the present invention relate generally to the stacking of articles on a conveyor to form a stream of assembled products. The embodiments of the invention shown and described herein relate to the assembly of frames wherein a plurality of articles are sequentially stacked onto each other to form a stream of assembled frames on a conveying surface.

An assembling apparatus 10 is shown in FIGS. 1–3 and a second embodiment, assembling apparatus 100, is shown in FIGS. 4–8. The assembling apparatus are utilized to stack and assemble articles on a conveyor 11 having a moving work surface 12. A plurality of work stations are provided wherein first articles, i.e. inverted frames 91, are spaced at work station 31 and wherein second, third and fourth articles are placed or stacked onto the first article at work stations 32, 33 and 34, respectively. The number of work stations and the nature of the articles being conveyed and stacked may vary in the assembling apparatus and process of the present invention.

The movement of the articles on conveyor 11 involves the positioning of the articles with respect to the various work stations so that subsequent articles or product elements may be precisely transferred onto the partly assembled frames, for example. The positioning of the articles involve the utilization of adjustable side guide rail structures, article sensing devices and article stop mechanisms. The latter elements of the assembling apparatus are further described below with respect to the embodiments shown in the drawings.

Referring to FIG. 1, an assembling apparatus 10 is shown wherein a stream of inverted frames 90 is supplied at one end and wherein a plurality of articles are sequentially stacked and transported to form a stream of assembled frames 95 at the opposite end. The assembling apparatus 10 is shown to sequentially move inverted frames 91 on a conveyor or moving work surface 11 from a setup work station 31 sequentially through work stations 32, 33 and 34, respectively, where articles, such as plates of glass, sales sheets and backing boards are placed into the confines of the inverted frames 91 at the respective work stations.

As shown, the assembling apparatus 10 has a conveyor structure 11 comprised of a continuously moving endless belt 12 disposed between frame rails 13 and 14. The conveyor 11 extends from a first end 15 to a second end 16 of the assembly apparatus 10. The continuously moving belt 12 transports the inverted frames 91 during assembly from the setup station 31 through work stations 32, 33 and 34. Positioned above the endless belt 12 are parallel line guides 17 and 18 between which the inverted frames 91 are moved. The line guide 17 is shown to be a continuous elongated structure, whereas line guide 18 is shown to be segmented wherein a plurality of gaps 89 are provided between the aligned line guide segments to form the elongated line guide 18.

The line guides 17 and 18 are shown to be supported by means of a plurality of support structures 19–26 which are connected to the opposing frame rails 13 and 14. For example, support structures 19, 21 and 22 connect frame rail 13 to line guide 17 and adjustable support structures 20, 23, 24, 25 and 26 connect frame rail 14 to line guide 18. Further, support structures 24 and 25, for example, show a pair of support structures which are positioned at work station 32. The latter support structures permit the line guide 18 to be adjusted with respect to gaps 89 so that the line guide 18 segments are aligned. Each line guide 17 and 18 has a face which contacts and guides the moving articles. Preferably, the line guides are constructed of a smooth material, i.e. stainless steel.

The endless belt 12 continuously moves and a plurality of line stop mechanisms, i.e., 27, 28, 29 and 30, are provided to momentarily stop the inverted frames 91 at predetermined locations between first end 15 and second end 16. The stop mechanisms 27, 28, 29 and 30 are controlled and activated by sensing assemblies, i.e., photoeyes, for example, and the stop mechanisms temporarily immobilize the frames 91 between the opposing line guide rails 17 and 18. The various articles or parts used to assemble the picture frames, i.e., glass plates 92 at work station 32, sales sheets 93 at station 33 and backing boards 94 at station 34 are sequentially placed and stacked into the frames to thereby assemble the frame product.

The stop mechanisms 27, 28 etc. are operative within the gaps 89 or between the segments of the line guide 18. Each stop mechanism is provided with a stop member structure having a forward member and a lateral member which temporarily traps or stops the article transported on the conveyor at a specified work station. The forward and lateral members of the respective line stop have surfaces which engage the article to thereby apply a normal and a perpendicular force to each article. The latter forces stop and align each article with respect to line guide 17 to thereby position the article for receiving a specified article from the aligned work station.

As shown in FIG. 1, the conveyor 11 provides a moving work surface within reach of the work stations 32, 33, 34 and 35. A work area 36 is shown between line guides 17 and 18 and which represents the area in which an inverted frame 91 is positioned for receiving a first article at station 32. The line guides 17 and 18 are adjustable to accommodate frames of various dimensions. Work area 37 having dimensions smaller than work area 36, is shown to represent the area in which a smaller inverted frame 91, for example, is positioned for receiving a first article at station 32. Further, adjustable support structure 20 of line guide 18 is shown to have an arm member 38 and a release and lock assembly 39 to permit the adjustability of the line 18 to thereby accommodate the work area dimensions, such as areas 36 and 37. The adjustable support structures 23, 24 and 25 are similarly constructed.

FIG. 1 further shows that two inverted frames 91 are simultaneously processed at each work station, i.e., two plates of glass 92 placed on two adjacent inverted frames 91. The number of frames processed, however, may be one, two or more at each work station. Although the assembling apparatus 10 is described with respect to the assembly of picture frames 91, it is likewise within the purview of this invention to place or stack other articles on a moving object at the respective work stations 32, 33, 34 and 35, such as stacking components used in the assembly of circuit boards, for example.

As shown further in FIGS. 1–3, a set up station 31 is initially utilized to momentarily stop the frames 91 for spacing and timing purposes. Line stop 30 is shown operative through line guide 18 for such purpose. Sensing and stop assemblies 42 and 43, which may include photo eyes, for example, are utilized in conjunction with activatable stop members and which cooperate with line stop 30 to effect the release of spaced inverted frames 91. For example, activatable members engage the frames 91 from above at a predetermined location of the frame structure. The stop members, for example, may be attached to the end of an activatable air cylinder. The frames 91 are released for transfer to work station 32 where line stops 27 and 28 temporarily immobilize the frames 91 with respect to line guides 17 and 18 to permit the transfer of a first article, such as glass plates 92 from magazine assembly 46 via an article placer assembly 48 and into the inverted frames 91. The frame 91 movement on conveyor 11 is repeated to work station 33 and subsequently to work station 34 where second and third articles, such as sales sheets 93 and backing boards 94, respectively, are placed and stacked into inverted frames 91 via article placer structures, as will be further described with respect to FIG. 10. The line stop mechanisms 27–30 are all synchronized and operated by sensing assemblies, i.e., photo eyes, which when activating the associated line stops cause the article placer assemblies to transfer and stack the respective articles at the respective work stations onto the frames 91 on the conveyor 11. For example, activation assemblies 40 and 41 are shown mounted at support structures 24 and 25, respectively, to operate line stops 28 and 27, respectively. Activation assemblies 40 and 41 may be pneumatically operated, however, other operating means known in the art may also be utilized to effect the momentary stoppage of the inverted frames at the respective work stations.

The operation of the article placer assemblies at work stations 32, 33 and 34 and the line stops, i.e., 27–30 for the frames 91 are all synchronized and controlled by a computerized line control system which includes software that processes signals from various sensing means used in the assembling apparatus 10. Thus, for example, the respective line stops will only activate when the presence of frames 91 are detected and the placer assemblies, i.e., placer 48 at station 32, will only transfer articles or parts when frames 91 are immobilized and positioned at the respective work station between the line guides 17 and 18.

The assembly apparatus 10 shown in FIGS. 1–3 utilizes stop mechanisms, i.e., 27 and 28, which are positioned and operative between the segmented product side rail 18 at rail gaps 89. Each stop mechanism has an article engagement member having a generally L-shaped configuration comprised of a lateral face and a forward face. This configuration traps and aligns the inverted frame against the opposing side rail 17. The segmented side rail configuration 18 requires the adjustment of the distance between the side rails 17 and 18 when the assembly of a different article size is desired, i.e. a different size frame structure. For example, each segmented portion of the side rail 18 is required to be individually adjusted with respect to each other and with respect to the unitary elongated side rail 17. Further, each stop mechanism is aligned with respect to adjacent segmented side rail members.

The assembly apparatus 100 shown in FIGS. 4–9 utilizes side rails 101 and 102 which are quickly and easily adjusted to accommodate product size changes. Both side rails 101 and 102 are unitary elongated structures disposed in a parallel arrangement above the conveyor 12.

Further difficulties which may arise with the assembly apparatus 10 are the size variations of the dimensions of the articles being transported and assembled on the conveyor 12 between the side rails 17 and 18. For example, the inverted frames 91 may have dimensional variations which make it difficult for stop members, i.e., 27 and 28, to properly position the inverted frames 91 with respect to work station 32, for example. Such improper placement may result in the placer assembly's inability to precisely place plate glass members within the periphery of the inverted frames 91. In summary, although the assembling apparatus 10 shown in FIGS. 1–3 provide the ability to assemble and stack uniformly dimensioned articles and which may be consistently so used subsequent set-up for a particular article size, FIGS. 4–9 show an alternate assembling apparatus embodiment 100 which provides a structure to overcome adjustability difficulties and which provides article stopping mechanisms and associated elements which overcome the above referenced difficulties relating to article dimension tolerances.

FIG. 4 is a top view of the assembling apparatus 100 which includes the conveyor 12, set up station 31 and work stations 32, 33, 34 and 35. The assembling apparatus 100 has opposing and parallel side rails 101 and 102 which are unitary and continuous in structure. Each side rail is adjustable with respect to conveyor 12 by means of support structures 103–106 and 107–110, respectively. Each adjustable support 103–106 has means to adjust the positioning of side guide 102. Adjustment mechanisms 107-110 are positioned to adjust the positioning of side guide 101. The adjustment means 103–106 and 107–110, as shown, include linear drive screws (107–110) which enable the machine operator to quickly turn the respective drive screws to thereby adjust the spacing between the side rails 101 and 102 as well as the distance between the side rails with respect to the work stations positioned adjacent to and within reach of the conveyor 12.

Figure 8:
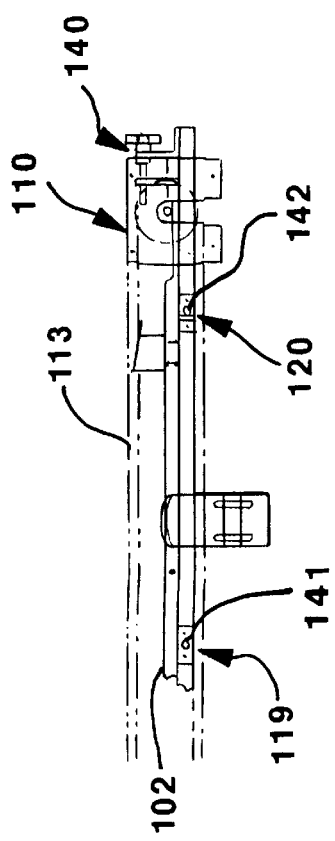
FIG. 8 is a partial view of the end section of the assembling apparatus of FIG. 4.

As shown in FIGS. 7 and 8, adjustment mechanism 108 is comprised of a threaded shaft 136 journaled at 137 and 138 and having an adjustment wheel 139. The mechanism 108 is constructed and arranged to move side guide 101 with respect to conveyor 12. Mechanism 108 has a gear and chain 111 and 112 arrangement which interconnect adjacent mechanisms 107 and 109. FIG. 8 shows connecting chain 113 in communication with adjustment mechanism 110. Further, an adjustment mechanism 140 provides means to linearly adjust side guide 102 and, thus, the line stop mechanisms 114–120.

The assembling apparatus 100 is shown to have a plurality of line stop mechanisms 114–120 which are generally aligned with respect to the work stations 32–34. The line stop mechanisms 114–120 include a plurality of apertures 141 and 142 in the side rail 102, as shown in FIG. 8, and a plurality of activatable elongated stop members which protrude through the side rail 102 apertures to stop the first articles being conveyed on the conveyor 12. The line stop mechanisms are activated by signal means similarly to those described with respect to assembling apparatus 10, except that the elongated stop members are activated for protrusion through aligned apertures in the side rail to thereby temporarily stop the first article for receiving an article from a work station.

As shown in FIG. 6, line stop mechanism 114 is comprised of an air cylinder 132 with plunger 133 and a terminal stop member 134 which protrudes through side guide 102. A sensing mechanism 131, such as a photo eye, is shown positioned over the conveyor. A handle member 135 is shown and which is utilized in the adjustment of the support structure 104 for side guide 102.

A plurality of article alignment mechanisms 121–126 are shown mounted to the side rail 101 and two such alignment mechanisms are shown with respect to each work station. The alignment mechanisms or roller assemblies 121–126, as shown in FIG. 6 with respect to assembly 121, each include a roller 130 which is mounted to shaft or plunger 129 and is biased by means of low pressure air cylinder 132. The alignment mechanisms are provided with anti-rotation means to maintain the rollers in a position of movement along with the article flow.

An alignment mechanism is activated subsequent the activation of a stop mechanism to thereby cause the roller 130 to engage the first article and to adjust its positioning with respect to the opposing side rail 102. The low pressure air cylinder 128, for example, causes roller 130 to protrude in gap 127 between side rail 101 and inverted frame 91, as shown in FIG. 6. The position adjustment of the first article results in its proper alignment with respect to the work station to thereby provide a consistent target for the placement of subsequent articles from the respective work station.

Referring to FIGS. 10–13, an article placing assembly 45 is shown positioned on an adjustable stand 44 at work station 32. The placing assembly 45 is shown to have a magazine assembly 46 with an article release mechanism 52 positioned at its exit end. The article supply magazine assembly 46 provides a stack of glass plates 47 for pickup and transfer by the article transfer assembly 48 to the work area on conveyor 11. The article or glass placing assembly 45 removes the first out plate of glass 88 from the glass stack 47 and moves it upwardly to position the glass plate 88 for pickup and transfer by the article transfer assembly 48. The glass placing assembly 45 positively controls each plate of glass by sliding it upwardly from the glass supply stack 47 and sequentially positions each glass plate for pickup and transfer by the article transfer mechanism 49 of the article transfer assembly 48. The article transfer mechanism 49 is shown to have a vacuum stem 51 and vacuum cup 50.

The magazine assembly 46 is mounted to and extends above base plate 54. Article guides 55 are provided to direct the article stack for movement on magazine deck 53 to the exit end of the magazine. As further shown, an air cylinder 62 is provided to operate the reciprocating placer assembly 48. For safety purposes, an exterior guard structure 56 having hinged doors with handles 57 are provided to cover the operating areas of the assembling apparatus 10.

Importantly, the article release mechanism 52 of magazine assembly 46 is comprised of synchronized and cooperating elements which include a vertical pushing mechanism 61, opposing pivoting side gate members 66 and 67, opposing fixed side clips 96 and 97 and activatable upper and lower side clamps 68 and 70 and 69 and 71, respectively. The clamp members 68 and 70 and 69 and 71 cooperate and function sequentially to position the first out glass plate 88 for removal from the glass stack 47 in the magazine 46. The vertical pusher 61 is shown to include a mount 58, a powered slide 59 and plate 60.

Figure 10:
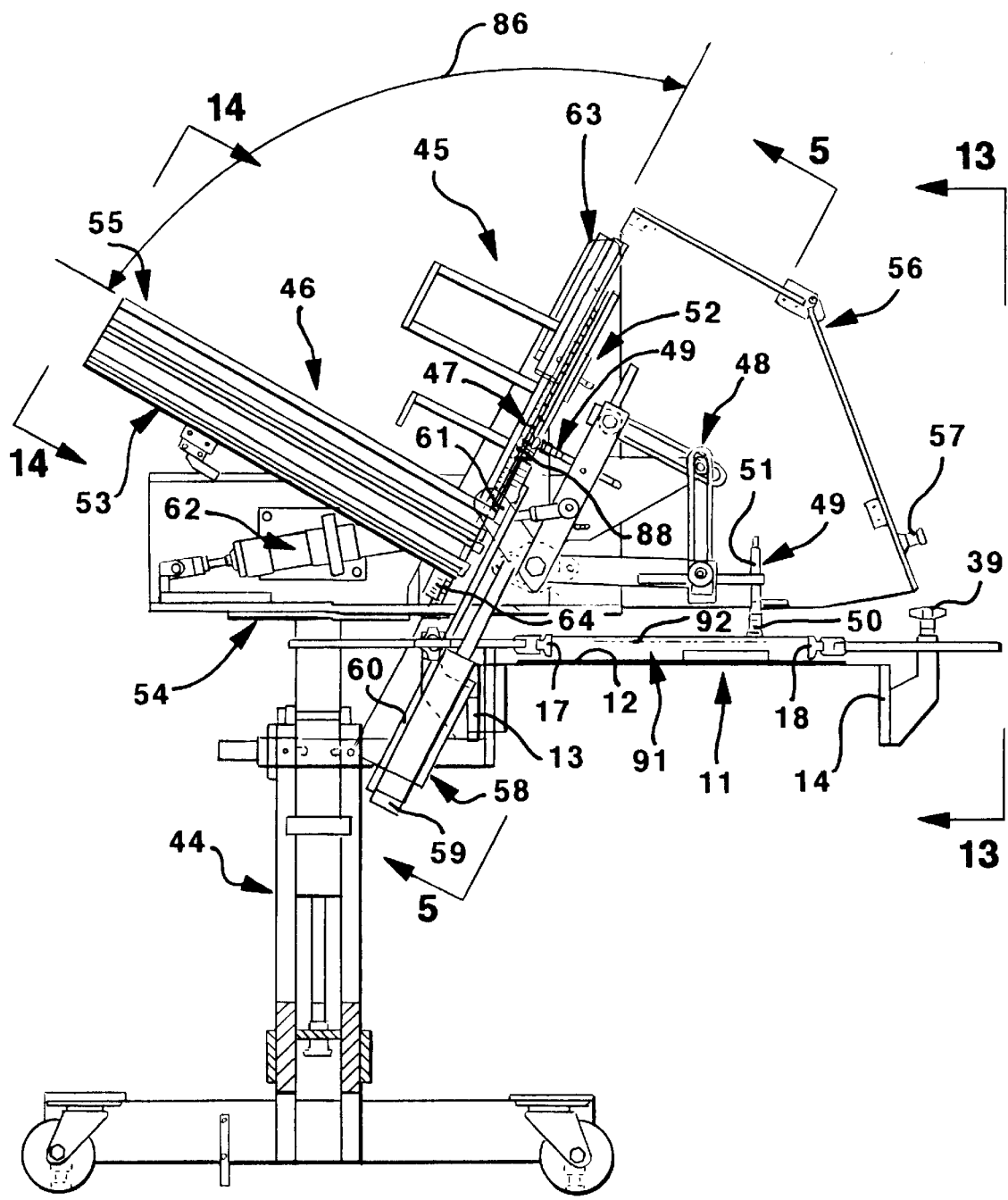
FIG. 10 is a side plan view showing the glass placing assembly of the present invention.
Figure 11:
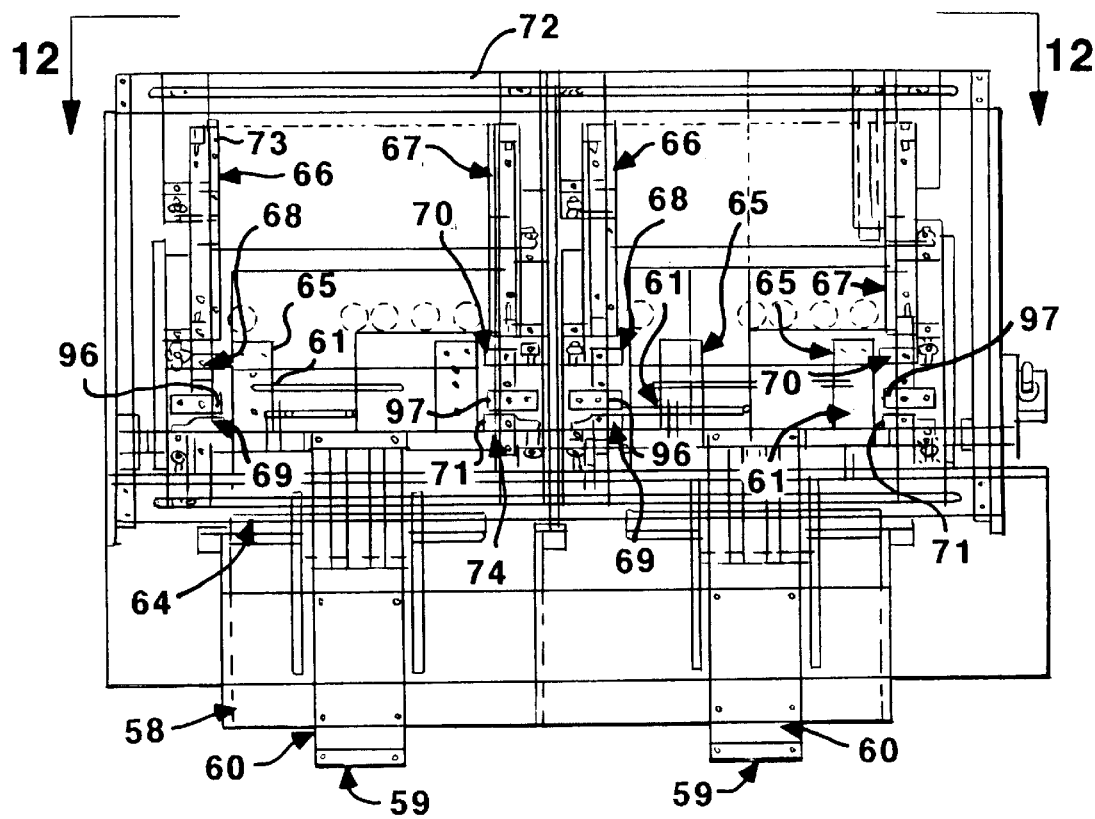
FIG. 11 is a view taken along line 11—11 of FIG. 10.
Figure 12:
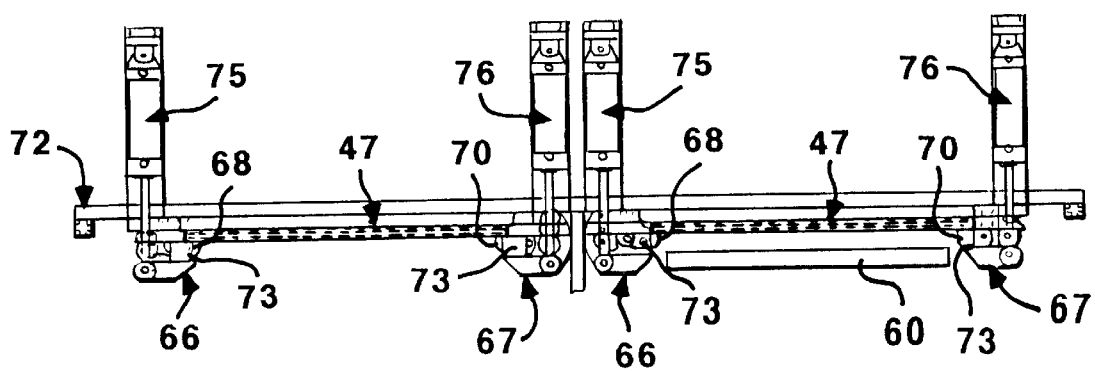
FIG. 12 is a view taken along line 12—12 of FIG. 11.

Referring specifically to FIGS. 10–12, the magazine is shown to have a lower cross bar 64 and an upper cross bar 72. Further, pivotable gates 66 and 67 are shown to be operated by air cylinders 75 and 76, respectively. However, as known in the art, the gates may be controlled by other means, i.e., mechanically, electrically, etc.

The article release mechanism 52 has a sequence of operating steps to move and position the next-out glass plate 88 with respect to the glass plate stack 47. The positioning of the next-out glass plate 88 permits the vacuum cups 50 of the article transfer mechanism 49 to engage and grasp successive glass plates from the magazine exit end for transfer. The sequence of the operating steps of the article release mechanism 52 will be described as the vertical pushing mechanism 61 is at its bottom or lower position of travel. When the vertical pushing mechanism 61 is at its lowest position, the glass plate stack 47 is held back or retained by the opposing fixed side clips 96 and 97 and the pivotable side gate members 66 and 67 which are in a closed position. The pusher head insert structure 65 having a pushing ledge engages the bottom of the next-out glass plate 88 and the pushing mechanism 61 moves the glass plate 88 upwardly with respect to the fixed side clips 96 and 97 and behind the closed pivotable side gate members 66 and 67. As this upward movement takes place, the lower hold back clamps 69 and 71 and the upper hold back clamps 68 and 70 are in an open position. As the pushing mechanism 61 clears the horizontal plane between the lower clamps 69 and 71, the lower clamps are closed or pivoted inward to engage the glass plate stack 47. As the pushing mechanism 61 clears the horizontal plane between upper hold back clamps 68 and 70, the opposing upper clamps are closed or pivoted inward to engage the top portion of the glass stack 47.

At this stage of operation, the vacuum cups 50 of the article transfer mechanism 49 of the placer assembly 48 engage the glass plate 88 and before movement of the vacuum cups 50 the opposing side gates 66 and 67 are pivoted outwardly into an open position to permit the glass plate 88 to be removed from the article release mechanism 52 for transfer into the inverted frames 91 on conveyor 11 at work station 32. Thus, before closure of the pivotable side gates 66 and 67, the glass plate stack 47 is retained or held back by the upper and lower hold back clamps 68 and 70 and 69 and 71, respectively. As the vertical pushing mechanism 61 is moved downwardly, the pivoting side gates 66 and 67 are moved into a closed position and the upper and lower hold back clamps 68 and 70 and 69 and 71 are sequentially opened or moved outwardly. The latter positioning of the elements of the article release mechanism 52 permits the glass plate stack 47 to slide downwardly in the magazine and to again be retained by the pivoting side gates 66 and 67 at the top and by the opposing fixed side clips 96 and 97 at the bottom. Thus, when the vertical pushing mechanism 61 reaches the bottom of its downward movement and the next pair of inverted frames 91 are moved to work station 32, the sequence of operation of the article release mechanism 52 is repeated as described above.

Figures 13, 14:
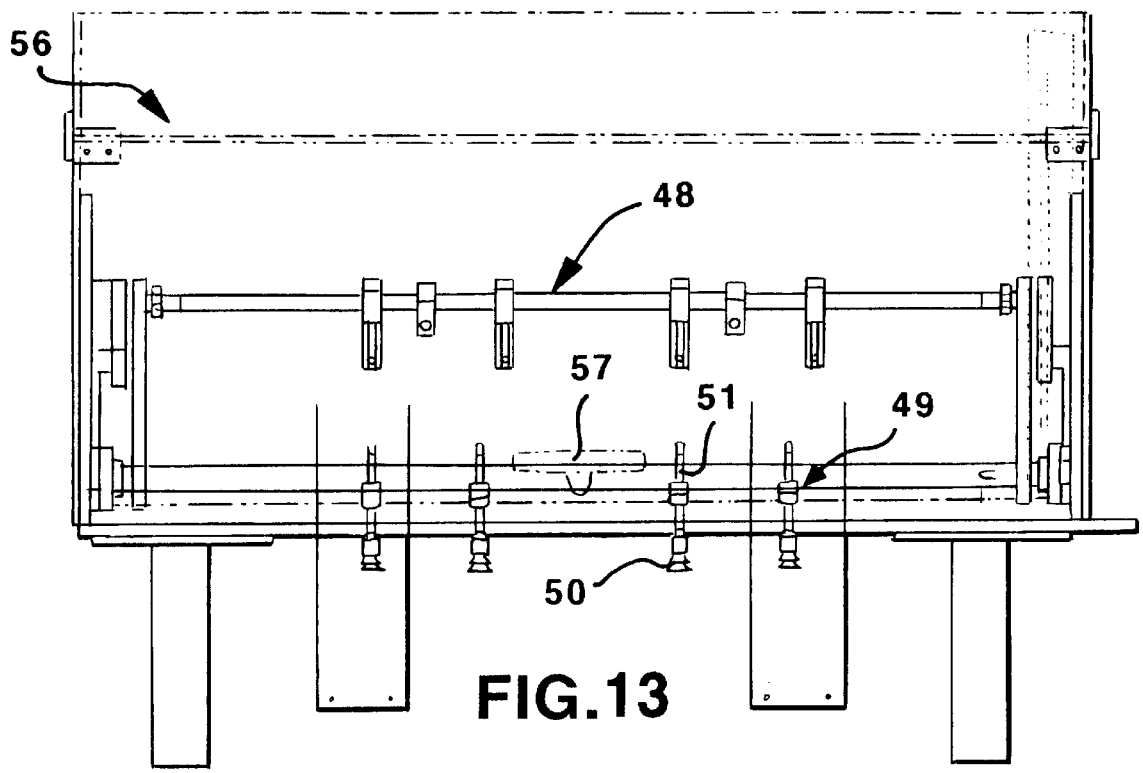
FIG. 13 is a view taken along line 13—13 of FIG. 10.
FIG. 14 is a view taken along line 14—14 of FIG. 10.

As shown in FIG. 14, the rear portion of the magazine assembly 46 has removable wear rails 79 and 80 which are positioned in rail channels 87 and secured therein by elongated bars or clamps 81 and 82. Each wear rail has a generally square cross-sectional configuration. The wear rails 79 and 80 engage the bottom surface of the glass plates which are slidingly disposed thereon. Consequently, the rails are constructed and arranged to be worn by this sliding movement. The wear rails 79 and 80 may be repositioned or turned into slots or channels 87 as the moving glass stack 47 wears a certain rail surface. Further, as shown in FIG. 10, the magazine deck 53 on which the glass stack 47 slides is disposed at an angle 86 of less than 90°, i.e., 87° with respect to the magazine exit end, to thereby minimize the wear of the glass bottom edges on the surface of rails 79 and 80.

To accommodate the dispensing and release of different sized articles, the magazine assembly 46 is shown to be adjustable. As shown positioned above the magazine deck 53, which is shown supported by structure 83, a riser structure 85 may be utilized to accommodate a smaller magazine 84. A fixed side guide 77 and a movable side guide 78 are provided for such adjustment purposes.

In summary, the glass placing assembly 45 is comprised of an article release mechanism 52 having a vertical pushing mechanism 61, side gate members 66 and 67 and upper and lower hold back clamps 68 and 70 and 69 and 71 which cooperate to move the next-out glass plate 88 from the stack 47 for subsequent transfer by the placer assembly 48. Although the elements of this assembly are shown and described to be pneumatically operated, these elements may also be controlled mechanically, hydraulically or electronically.

As many changes are possible to the embodiments of this invention utilizing the teachings thereof, the descriptions above, and the accompanying drawings should be interpreted in the illustrative and not the limited sense.

That which is claimed:

1. An assembling apparatus comprising:
    (a) a conveyor having opposing, elongated line guides thereabove, and comprising at least one adjustable line guide to adjust the spacing between said line guides;
    (b) means to place articles onto said conveyor between said parallel line guides, said articles including first articles; and
    (c) at least one line stop mechanism constructed and arranged to be adjusted with said at least one adjustable line guide and to momentarily stop articles on said conveyor with respect to said line guides, each said at least one line stop mechanism further having an activatable mechanism constructed and arranged to move relative to said at least one adjustable line guide and to engage said first articles.

2. A process for assembling articles comprising:
    (a) providing a conveyor having a moving horizontal work surface and having a pair of parallel and elongated line guides thereabove and defining an article movement path, at least one said line guide being adjustable to adjust the spacing between said line guides;

(b) providing a stream of first articles on said conveyor;

(c) providing at least one line stop mechanism constructed and arranged to be adjustable with said at least one adjustable line guide and to move relative to said line guides into engagement with said first articles;

(d) laterally adjusting said at least one said line guide with said at least one line stop mechanism to provide an article movement path having a predetermined width;

(e) stopping said first articles at a predetermined position along said article movement path by means of said at least one line stop mechanism; and (f) releasing said first article for further movement on said conveyor.

3. An assembling apparatus, comprising:

(a) a conveyor having opposing and elongated line guides positioned thereabove and defining an article movement path, said line guides including at least one adjustable line guide for adjusting the width of said article movement path;

(b) means to place first articles onto said conveyor between said line guides; and (c) at least one line stop mechanism operative through said at least one adjustable line guide and being constructed and arranged to be adjusted with said at least one adjustable line guide and further being constructed and arranged for movement into engagement with said first articles to momentarily stop said first articles on said conveyor.

4. The assembling apparatus of claim 3, further comprising an article sensing element coupled with said at least one line stop mechanism.

5. The assembling apparatus of claim 3, further comprising an article alignment and biasing structure.

6. The assembling apparatus of claim 3, further comprising means to place at least one second article and wherein said at least one second article is placed into the confines of said first article.

7. The assembling apparatus of claim 6, wherein said means to place at least one second article is comprised of an article supply magazine and an article transfer assembly and wherein said second article is stacked on said first article.

8. The assembling apparatus of claim 1, further comprising at least one article sensing element coupled with said at least one said line stop mechanism.

9. The assembling apparatus of claim 1, further comprising an article alignment and biasing structure.

10. The assembling apparatus of claim 1, wherein said articles further comprise second articles.

11. The assembling apparatus of claim 10, wherein said means to place articles further comprises means to place said second articles comprising an article supply magazine and an article transfer assembly.

12. The assembling apparatus of claim 10, wherein said article transfer assembly places at least one second article from said article supply magazine into the confines of said first article.

13. The assembling apparatus of claim 10, wherein said first articles are picture frames and said second articles are comprised of glass pieces, sales sheets, and backing boards.

14. The process of claim 2, wherein said at least one line stop mechanism is activated by an article sensing element.

15. The process of claim 2, wherein an article alignment and biasing structure is provided for positioning said first articles on said article movement path.

16. The process of claim 2, wherein means to place at least one second article onto said article movement path is provided.

17. The process of claim 2, wherein at least one second article is transferred into the confines of each said first article.

18. The process of claim 2, wherein at least one second article is stacked onto each said first article.

19. The process of claim 2, wherein at least one workstation is provided and wherein each said workstation has a supply magazine for releasably storing a second article and wherein a reciprocating placer device is provided to place the second article.

20. The process of claim 16, wherein said first articles are frames, and said second articles are comprised of glass pieces, sales sheets, and backing boards.

* * * * *